(12) United States Patent
Sasmaz et al.

(10) Patent No.: US 11,370,288 B2
(45) Date of Patent: Jun. 28, 2022

(54) ENERGY STORAGE UNIT FOR A MOTOR VEHICLE HAVING A SUPPORT FRAME WHERE STORAGE MODULES OF THE ENERGY STORAGE UNIT ARE INSERTED INTO RECEIVING OPENINGS OF THE SUPPORT FRAME FROM BELOW

(71) Applicant: Daimler AG, Stuttgart (DE)

(72) Inventors: Nihat Sasmaz, Nagold (DE); Matthias Nohr, Esslingen (DE); Franz Maier, Alfdorf (DE); Shunsuke Amagai, Stuttgart (DE)

(73) Assignee: Daimler AG, Stuttgart (DE)

( * ) Notice: Subject to any disclaimer, the term of this patent is extended or adjusted under 35 U.S.C. 154(b) by 103 days.

(21) Appl. No.: 16/955,304

(22) PCT Filed: Nov. 9, 2018

(86) PCT No.: PCT/EP2018/080716
§ 371 (c)(1),
(2) Date: Jun. 18, 2020

(87) PCT Pub. No.: WO2019/120741
PCT Pub. Date: Jun. 27, 2019

(65) Prior Publication Data
US 2021/0016649 A1    Jan. 21, 2021

(30) Foreign Application Priority Data
Dec. 22, 2017   (DE) ..................... 10 2017 011 994.5

(51) Int. Cl.
*B60K 1/04* (2019.01)
*B60L 50/60* (2019.01)
(Continued)

(52) U.S. Cl.
CPC ............. *B60K 1/04* (2013.01); *B60L 50/66* (2019.02); *H01M 50/20* (2021.01);
(Continued)

(58) Field of Classification Search
CPC .......... B60K 1/04; B60L 50/66; H01M 50/20
See application file for complete search history.

(56) References Cited

U.S. PATENT DOCUMENTS 5,501,289 A * 3/1996 Nishikawa ............ H01M 50/20
180/68.5
9,321,338 B2 4/2016 Naruke
(Continued)

FOREIGN PATENT DOCUMENTS

DE    10 2011 112 572 A1    3/2013
DE    10 2014 115 090 A1    4/2015
(Continued)

OTHER PUBLICATIONS

PCT/EP2018/080716, International Search Report dated Feb. 21, 2019 (Two (2) pages).

Primary Examiner — Jonathan Ng
Assistant Examiner — James J Triggs
(74) Attorney, Agent, or Firm — Crowell & Moring LLP (57) ABSTRACT

An energy storage unit for a motor vehicle has a support frame which can be non-destructively detachably mounted on a body of the motor vehicle and a plurality of storage modules for storing electrical energy which can be mounted on the support frame. The storage modules are configured as intrinsically sealed units which can be arranged on the support frame from bottom to top in the vertical direction of the vehicle and can be inserted into respective corresponding receiving openings in the support frame.

9 Claims, 5 Drawing Sheets

(51) Int. Cl.
  *H01M 50/20* (2021.01)
  *B60K 1/00* (2006.01)
(52) U.S. Cl.
  CPC ............... *B60K 2001/005* (2013.01); *B60K 2001/0438* (2013.01); *B60K 2001/0472* (2013.01); *H01M 2220/20* (2013.01)

(56) References Cited

U.S. PATENT DOCUMENTS

| | | |
|---|---|---|
| 9,511,657 B2 | 12/2016 | Engler et al. |
| 10,207,573 B2 | 2/2019 | Hara |
| 2011/0174556 A1* | 7/2011 | Hermann ................ B60L 50/66 180/65.1 |
| 2016/0126515 A1 | 5/2016 | Hill et al. |
| 2016/0311301 A1* | 10/2016 | Ikeda ....................... B60K 1/04 |
| 2016/0318556 A1* | 11/2016 | Ikeda ................... B62D 27/023 |
| 2017/0225558 A1 | 8/2017 | Newman et al. |
| 2017/0305249 A1* | 10/2017 | Hara ...................... H01M 50/20 |
| 2019/0326573 A1* | 10/2019 | Ozawa ................. H01M 50/20 |
| 2019/0359048 A1* | 11/2019 | Tsuyuzaki ........... B62D 21/157 |
| 2019/0359260 A1* | 11/2019 | Tsuyuzaki ............... B60R 16/04 |
| 2020/0031399 A1* | 1/2020 | Matsuda ............. B62D 21/157 |

FOREIGN PATENT DOCUMENTS

| | | |
|---|---|---|
| DE | 10 2014 108 160 A1 | 12/2015 |
| DE | 10 2015 008 930 A1 | 1/2017 |
| DE | 10 2017 206 566 A1 | 10/2017 |
| JP | 3050010 B2 | 3/1995 |

\* cited by examiner

ENERGY STORAGE UNIT FOR A MOTOR VEHICLE HAVING A SUPPORT FRAME WHERE STORAGE MODULES OF THE ENERGY STORAGE UNIT ARE INSERTED INTO RECEIVING OPENINGS OF THE SUPPORT FRAME FROM BELOW

BACKGROUND AND SUMMARY OF THE INVENTION

The invention relates to an energy storage unit for a motor vehicle. Furthermore, the invention relates to a mounting arrangement of an energy storage unit on a body of a motor vehicle and to a motor vehicle.

Such an energy storage unit for a motor vehicle and such a mounting arrangement of an energy storage unit on a body of a motor vehicle are already known, for example, from DE 10 2011 112 572 A1. The energy storage unit comprises a support frame which can be non-destructively detachably mounted on a body of the motor vehicle and a plurality of storage modules for storing electrical energy which can be mounted on the support frame. In the mounting arrangement, the energy storage unit is mounted on the body by mounting the support frame reversibly, i.e., non-destructively detachably, on the body.

In addition, DE 10 2014 108 160 A1 discloses an underbody for stiffening a motor vehicle body of a motor vehicle, having a floor body which can be connected to the motor vehicle body to transfer static and/or dynamic loads of the motor vehicle body.

A battery module emerges from DE 10 2014 115 090 A1, which is detachably attached under the floor of a body of a vehicle. The battery module has a battery tray, a battery cover and a battery group. The battery group is arranged in a space closed by the battery cover and the battery tray. The battery module is mounted on seat cross-members which are already present, such that there is no need for separate mounting brackets.

A motor vehicle emerges from DE 10 2017 206 566 A1, on the underside of which a battery pack consisting of several storage modules is arranged, which has a trough-shaped housing for receiving the storage modules, which can be closed by means of a lid. The mounting of the battery pack on the motor vehicle occurs on side skirts and on a floor element provided underneath a passenger compartment, namely on cross members provided on the side of the floor element facing the roadway and extending between the side skirts. When the battery pack is mounted on the motor vehicle, the cover is arranged opposite the floor element of the motor vehicle, such that the entire battery pack must first be dismounted from the motor vehicle in order to remove one of the storage modules. The effort required for this is correspondingly high.

The object of the present invention is to further develop an energy storage unit, a mounting arrangement and a motor vehicle of the type mentioned above in such a way that a particularly rigid connection of the energy storage unit to the body of the motor vehicle can be implemented in a particularly cost-effective manner, and a simple replacement of the storage modules attached to the support frame is also possible even with support frames already mounted on the motor vehicle.

The energy storage unit is characterized in that, when the storage modules are mounted on the support frame, a free space is provided between at least two adjacently arranged storage modules, into which free space, when the support frame is mounted in a body, at least one retaining element provided on a side of a floor of the body which points downwards in the vertical direction of the vehicle projects, on which retaining element the support frame can be or is mounted on the body. In addition, the storage modules are designed as intrinsically sealed units which can be or are arranged on the support frame from bottom to top in the vertical direction of the vehicle and can be or are inserted into the corresponding receiving openings of the support frame. In this way, the support frame can, for example, be fitted with the storage modules in a particularly simple manner in its state of being held or mounted on the body. In other words, the respective storage module can also be easily mounted on the support frame and dismounted from the support frame while the support frame is attached to the body. This makes it possible, for example, to dismount individual storage modules and, for example, to replace them without having to dismount the support frame and thus without having to dismount all the storage modules.

The retaining element is, for example, a retaining support or a retaining bracket, wherein the support frame is reversibly detachably connected to the body via the retaining element, i.e., is held to the body. Since the retaining element is fixed to the body, i.e., is part of the body or part of a body shell of the body and not, for example, a component of the energy storage unit or the support frame, and since the retaining element projects into the free space between the adjacent storage modules, a particularly high degree of rigidity can be implemented, such that particularly advantageous accident performance can be represented, in particular with regard to a side impact such as a pole impact, for example. In addition, since the support frame and thus the energy storage unit can be attached or fastened to the body non-destructively, i.e., reversibly detachably, the motor vehicle, which is in particular designed as a passenger car, for example, can be equipped with the energy storage unit in a particularly simple and cost-effective manner. This means that the motor vehicle as a whole can be manufactured particularly cost-effectively. In addition, the energy storage unit can, for example, be protected particularly well against excessive accident-related forces and thus damage when the support frame is mounted on the body, since the retaining element projecting into the free space can form a load path through which accident-related forces can be absorbed and directed particularly advantageously. Since the retaining element is a component of the body or body shell, the force path runs in or via the body shell and thus not in the energy storage unit, such that accident-related loads on the energy storage unit can be kept low.

In an advantageous design of the invention, the support frame is screwed to the retaining element in its state fixed to the body. In this way, the support frame and with it, for example, the storage modules, can be mounted on and detached from the body in a particularly simple and cost-effective manner, such that, for example, the energy storage unit can be assembled and disassembled as a whole in an advantageous manner.

In order to be able to implement a particularly high degree of rigidity and thus a particularly advantageous connection of the energy storage unit to the body, it is provided in a further embodiment of the invention that the retaining element is formed by a cross member running in the transverse direction of the vehicle. As a result, the aforementioned load path, for example, can run in the transverse direction of the vehicle, such that loads caused by an accident can be absorbed and guided particularly advantageously in the event of a side impact. The aforementioned floor, on the side of which the retaining element is provided facing downwards in the vertical direction of the vehicle, is preferably a so-called main floor of the body preferably designed as a self-supporting body shell, wherein the main floor extends in the longitudinal direction of the vehicle between a front axle and a rear axle of the motor vehicle. The main floor and preferably the retaining element, in particular the cross member, are also preferably a component of the body shell, such that a particularly high degree of rigidity of the motor vehicle as a whole can be implemented.

A further embodiment is characterized by the fact that the respective side skirts of the body are connected to the floor on both sides in the transverse direction of the vehicle. When the energy storage unit is mounted on the body, the storage modules and/or the support frame, for example, are thus at least partially covered by the side skirts towards the outside in the transverse direction of the vehicle, such that the energy storage unit can be particularly well protected in its state mounted on the body.

In order to be able to implement a particularly high degree of rigidity and a particularly advantageous guidance of accident-related loads here, it is provided in a further embodiment of the invention that the cross member forming the retaining element extends from one of the side skirts in the transverse direction of the vehicle continuously to the respective other side skirt or vice versa. The cross member can thus serve in a particularly advantageous manner to stiffen the body shell, in particular with regard to a side impact, and in the case of such a load case designed as a side impact, it can form a force path which, although it extends continuously in the transverse direction of the vehicle, passes the storage modules—also referred to as individual modules. This means that the load path runs between the adjacent storage modules and thus bypasses the storage modules. The storage modules are thus not arranged in the load path and can be protected in an advantageous way from excessive accident-related loads.

In order to be able to implement a particularly rigid connection of the support frame and the energy storage unit as a whole to the body, it is provided in a further embodiment of the invention that the support frame in its state mounted on the body is non-destructively detachably mounted on at least one of the side skirts, in particular on both side skirts. It has been shown to be particularly advantageous if the support frame is screwed to the at least one side skirt or to both side skirts, such that the support frame can be assembled on and disassembled from the body in a particularly time- and cost-effective manner.

Preferably, the retaining element is placed on the side and thus on the floor, in particular in the vertical direction of the vehicle from below, such that sealing problems to the interior of the motor vehicle can be avoided.

By way of example, the respective receiving opening of the support frame, in particular provided for each storage module, is a through opening. Since the respective storage module is arranged in the respective receiving opening, a particularly high degree of rigidity of the support frame and the vehicle as a whole can be implemented. In particular, an at least substantially grid-like structure of the support frame can be implemented, such that its weight can be kept particularly low, for example. The feature that the respective storage module is intrinsically sealed means, in particular, that the respective storage module is protected against moisture coming in from the outside.

In order to be able to equip the support frame particularly easily with the storage modules and to be able to disassemble the storage modules particularly easily from the support frame, it is provided in a further embodiment of the invention that the storage modules in their state mounted on the support frame are non-destructively detachably mounted on the support frame. By way of example, the respective storage module is screwed to the support frame.

In a particularly advantageous exemplary embodiment of the energy storage unit, it is provided that the support frame has a receiving opening designed as a through-opening for each of the storage modules, which is delimited in the peripheral direction—preferably orbitally—by respective longitudinal and transverse support elements of the support frame. The storage modules—when the energy storage unit is mounted on the motor vehicle—are inserted into the respective opening from underneath and project over a large part of their height measured in the vehicle vertical direction (z-direction) beyond the upper side of the support frame facing the vehicle main floor. Preferably, each of these storage modules can be mounted on the support frame independently of the others, such that when the support frame is mounted on the vehicle, it is possible to exchange a respective storage module by detaching it from the support frame mounted on the vehicle and removing it downwards from the support frame.

In a particularly advantageous exemplary embodiment of the energy storage unit, it is further provided that the storage modules have respective mounting flanges which, when mounted on the support frame, either rest directly against the support frame, or another separating layer or a separating element, for example a seal, is provided between the support frame and the respective storage module. When assembling the storage modules on the support frame, these mounting flanges can serve as a stop and thus as an insertion limiting device, i.e., the respective storage module is inserted into the respective receiving opening in the support frame from below until the mounting flanges abut the support frame. This facilitates the assembly of the energy storage unit in an advantageous way.

In order that the storage modules can be detached and removed individually from the support frame when it is assembled on the vehicle, whether for maintenance purposes or replacement, it goes without saying that the electrical connection/contact of the storage modules with each other and/or with parts of the drive train is arranged and designed in such a way that this is also possible when the support frame is assembled on the vehicle. In other words, the contacts/electrical connections on the energy storage unit are accessible from below, i.e., from the side facing away from the main floor of the vehicle.

In order to develop a mounting arrangement of the type specified herein, it is provided in accordance with the invention that a free space is provided between at least two adjacently arranged storage modules, in which free space at least one retaining element provided on a side of a floor of the body pointing downwards in the vertical direction of the vehicle, also referred to as the underside, projects, by means of which retaining element the support frame is mounted on the body. Here, the storage modules are designed as intrinsically sealed units which can be arranged on the support frame from bottom to top in the vertical direction of the vehicle and can be inserted into respective corresponding receiving openings in the support frame. Advantages and advantageous designs of the energy storage unit according to the invention are to be regarded as advantages and advantageous designs of the mounting arrangement according to the invention and vice versa. By way of example, the support frame is reversibly detachably connected to the retaining element in such a way that the support frame is screwed to the retaining element.

In an advantageous method for manufacturing the mounting arrangement, for example, the storage modules and the support frame equipped with the storage modules form a structural unit or an assembly which can thus be mounted as a whole on the body shell, in particular in that the support frame is non-destructively detachably mounted on the retaining element. In this way, the assembly can in particular be mounted and dismounted in a simple, time-efficient and cost-effective manner if the assembly has a high weight of, for example, several hundred kilograms. The feature that the support frame is equipped with the storage modules means in particular that the storage modules, also referred to as single cell modules, are mounted on the support frame, in particular in a non-destructive or reversibly detachable manner.

If the number of storage modules that can be or are mounted on the support frame is greater than 2, at least two of the storage modules are arranged adjacent to one another in their state mounted on the support frame, such that the free space is provided between the two adjacently arranged storage modules. The feature that the storage modules are arranged adjacent to each other is to be understood in particular to mean that the storage modules are arranged directly next to one another or that no other, further storage module is arranged between the adjacently arranged storage modules. Here, the free space is partially limited in each case, for example, directly by the adjacently arranged storage modules.

It should be noted that, after the motor vehicle has been manufactured or completed, it is now possible to disassemble and replace individual storage modules from the support frame, in particular while the support frame is reversibly detachably held on the body. In this way, the respective storage modules can be detached individually from the support frame and removed from the motor vehicle, while, for example, the respective other storage modules remain mounted on the support frame and, via the support frame, on the body. In this way, for example, individual storage modules can be replaced without removing the support frame from the body shell. In this way, the respective storage modules can be replaced by one person particularly easily, since the respective storage module itself is only light in weight and can therefore be handled manually by the person in question in a simple and ergonomic manner.

In a particularly preferable exemplary embodiment, it is provided that the floor of the motor vehicle is designed to be closed.

Further details of the invention emerge from the following description of a preferred exemplary embodiment and from the drawings. The features and combinations of features mentioned above in the description as well as the features and combinations of features mentioned below in the figure descriptions and/or shown in the Figures alone can be used not only in the combination specified in each case, but also in other combinations or on their own without leaving the scope of the invention.

DETAILED DESCRIPTION OF THE DRAWINGS

Figure 1:
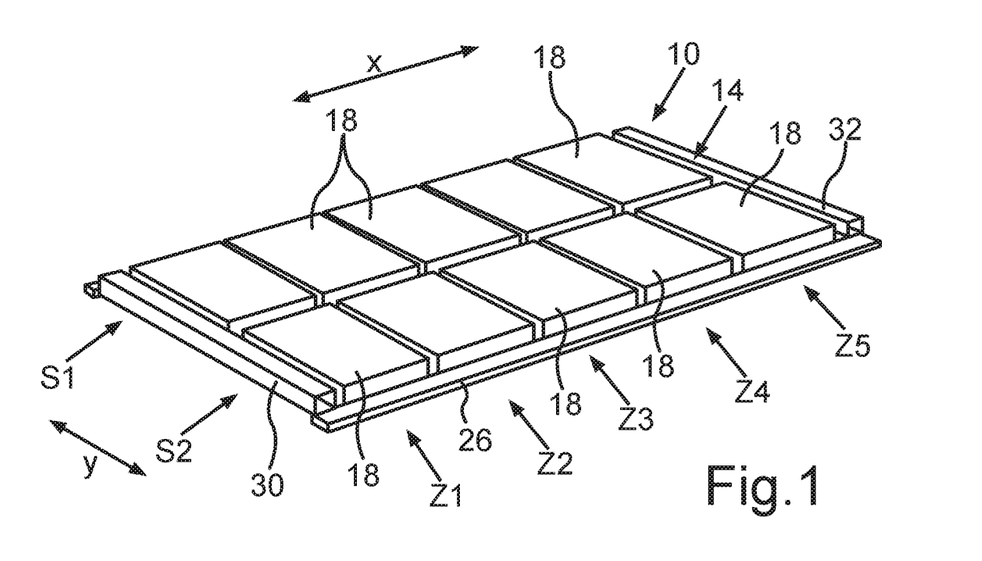
FIG. 1 is a schematic perspective view of an energy storage unit for a motor vehicle, having a support frame which can be non-destructively detachably mounted on a body of the motor vehicle, and having a plurality of storage modules for storing electrical energy which can be non-destructively detachably mounted on the support frame.

FIG. 1 shows a schematic perspective view of an energy storage unit 10 for a motor vehicle, in particular for a motor vehicle designed as a passenger car, for example. The motor vehicle comprises a body which is preferably designed as a self-supporting body shell. The body has a floor in the form of a main floor 12 (FIG. 3), by which, for example, the interior of the motor vehicle, in particular the passenger compartment, is at least partially, in particular at least predominantly or completely, delimited downwards in the vertical direction of the vehicle. In the completely manufactured state of the motor vehicle, the main floor 12 extends in the longitudinal direction (x-direction) of the vehicle between a front axle and a rear axle of the motor vehicle arranged behind it in the longitudinal direction of the vehicle and between two outer longitudinal members, which are also referred to as side skirts. The main floor 12 can be formed from one or more parts and is altogether a flat, in particular tabular, preferably inherently rigid component which, in the completed state of the motor vehicle, prevents liquid and moisture from penetrating into the interior of the vehicle. For this purpose, the main floor 12 is preferably designed to be liquid-tight and, at its edge regions where it is attached to adjacent body shell components, such as the side skirts, is also tightly connected to these components towards the front to a front wall and towards the rear to a corresponding end wall or similar, for example by means of adhesive or welded connections and/or correspondingly effective sealing means.

Figure 2:
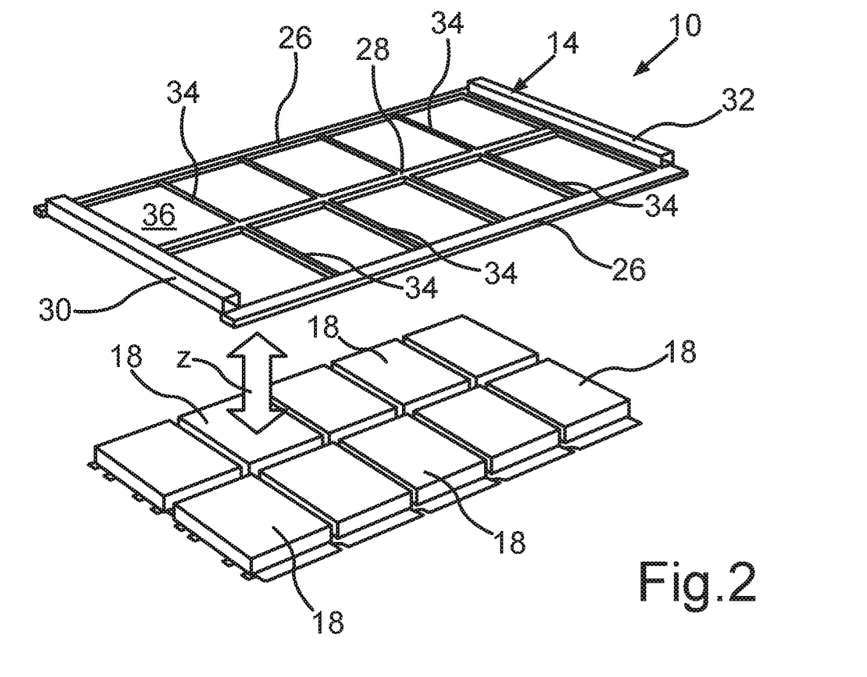
FIG. 2 is a schematic exploded view of the energy storage unit according to FIG. 1.
Figure 3:
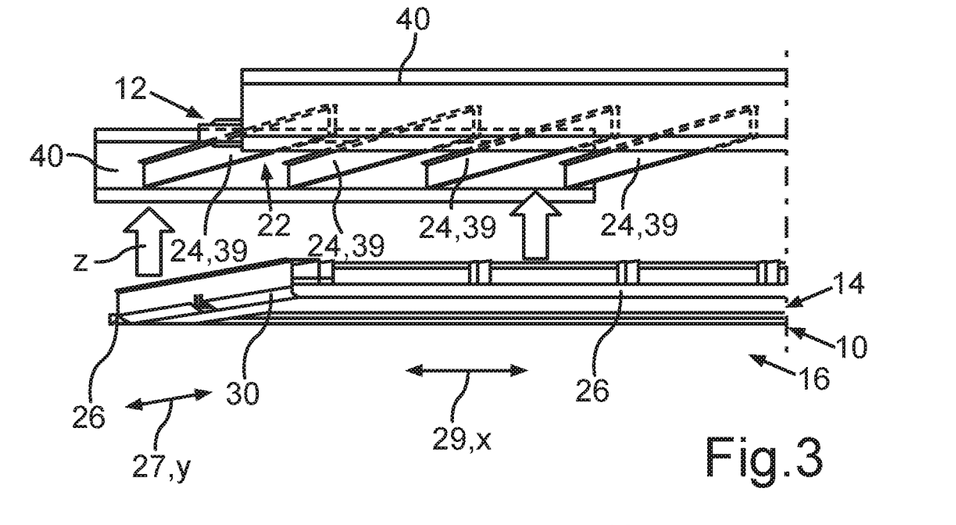
FIG. 3 in sections, is a schematic perspective view of a mounting arrangement of the energy storage unit on the body.

It can be seen particularly easily from an overview of FIG. 2 that the energy storage unit 10 has a support frame 14 which, when the motor vehicle is completely manufactured, can be or is non-destructively or reversibly detachably mounted on the body, such that the energy storage unit 10 is reversibly detachably fixed to the body via the support frame 14. In sections, FIG. 3 shows a schematic exploded view of a mounting arrangement 16, in which the support frame 14 and, via this, the energy storage unit 10 are reversibly detachably, i.e., non-destructively detachably, mounted on the body.

Furthermore, the energy storage unit 10 comprises a plurality of storage modules 18, which can be or are mounted on the support frame 14 in a non-destructively detachable manner. In particular, the storage modules 18 are non-destructively detachably mounted on the support frame 14 in the completely manufactured state of the motor vehicle or in the mounting arrangement 16. The respective storage module 18 is also referred to as a single-cell module and has at least or exactly one storage cell for storing electrical energy. Preferably, the respective storage module 18 has a plurality of electrically connected storage cells, by means of which electrical energy or electrical current can be stored. The respective storage cell is designed as a battery cell, for example, such that the respective storage module 18 is designed as a battery module, for example.

When the energy storage unit 10 is completely manufactured, the storage modules 18 are non-destructively detachably mounted on the support frame 14. Furthermore, the storage modules 18 are electrically connected to one another, such that the energy storage unit 10 can provide a high electrical voltage of several hundred volts, for example. In this way, high electrical outputs can be implemented for the electric drive of the motor vehicle, which is designed as an electric or hybrid vehicle, for example. The motor vehicle comprises at least one electrical machine by means of which the motor vehicle can be electrically driven. In order to drive the motor vehicle by means of the electrical machine, the electrical machine is supplied with electrical energy stored in the storage modules 18. Since the storage modules 18 are connected to one another in the completely manufactured state of the energy storage unit 10 and are designed, for example, as battery modules, the energy storage unit 10 is designed, for example, as a battery, in particular as a high-voltage battery (HV battery).

It can be seen from FIG. 1 that the storage modules 18, when non-destructively detachably mounted on the support frame 14, are arranged in a matrix-like manner or in matrix form, such that the storage modules 18 form at least or exactly two columns S1 and S2 arranged next to each other in the transverse direction of the vehicle (y-direction of the co-ordinate system used in body shell construction) with in each case five rows Z1, Z2, Z3, Z4 and Z5 arranged successively in the longitudinal direction of the vehicle (x-direction of the co-ordinate system used in body shell construction). In other words, each row Z1-Z5 has at least or exactly two storage modules 18 arranged next to each other in the transverse direction of the vehicle.

In order to implement a particularly high degree of rigidity in a cost-effective manner, at least a part of the storage module 18 of the respective column S1 or S2 is arranged in such a way that a free space 20 (FIG. 4) is provided between at least two of the storage modules 18 of the respective column S1 or S2 in the vehicle longitudinal direction, into which free space, in the mounting arrangement 16 or when the support frame 14 is mounted on the body, at least one retaining element 24 projects, which is provided on a side 22 (FIG. 3) of the main floor 12 pointing downwards in the vertical direction of the vehicle (z-direction of the coordinate system used in body shell construction), and on which the support frame 14 can be or is mounted in a non-destructively detachable manner.

In the exemplary embodiment illustrated in FIGS. 1 to 7, it is provided in particular that the rows Z1-Z5, which follow one another in the longitudinal direction of the vehicle, are arranged in such a way that, between two respective rows Z1 and Z2, Z2 and Z3, Z3 and Z4, and Z4 and Z5 arranged adjacent to one another in the longitudinal direction of the vehicle, a respective free space 20 is provided, into which a respective retaining element 24 provided on the side 22 projects. Since in the exemplary embodiment illustrated in the Figures five rows Z1-Z5 are provided, four retaining elements 24 are provided, which project into the respective free spaces 20 provided between the respective adjacently arranged rows Z1-Z5.

It can be seen from FIG. 2 that the support frame 14 is at least substantially grid-shaped and thus has a grid structure. For this purpose, the support frame 14 comprises two outer, lateral longitudinal member elements 26 and a central longitudinal member element 28, wherein the longitudinal member elements 26 and 28 are connected to each other via respective cross member elements 30, 32 and 34 of the support frame 14. The longitudinal member elements 26 and 28 as well as the cross member elements 30, 32 and 34 are respective support elements of the support frame 14. Here, the support frame 14 has a receiving opening 36 designed as a through opening for each storage module 18 and which is completely orbitally limited in the peripheral direction by the respective support elements of the support frame 14. The respective storage module 18 is, for example, arranged in the respective receiving opening 36, i.e., the respective storage module 18 is inserted into the respective receiving opening 36 and for the most part projects beyond the flat/upper side facing the vehicle main floor 12 beyond the support frame 14, as can easily be seen from FIG. 1 in conjunction with FIG. 2. The outer dimensions and contours of the preferably identically designed storage modules 18 are adapted to the inner dimensions and contours of the preferably identical receiving openings 36, or vice versa, in such a way that the storage modules 18 are arranged in the respective receiving opening 36 substantially free of play or with only slight play and the gap existing between the respective storage module and the receiving openings is preferably uniform and correspondingly small.

In particular, it is conceivable that the respective support element of the support frame 14 is formed from aluminium, such that the support frame 14 is designed as an aluminium frame, for example. Alternatively or additionally, the respective support element of the support frame 14 is formed as an extruded profile (SPP), such that a particularly low weight and a particularly high degree of rigidity of the support frame can be implemented.

The storage modules 18 are separately formed modules, such that each storage module 18 is an independent component in its own right. Furthermore, the respective storage module 18 is individually and thus independently of the respective other storage modules 18 non-destructively detachably mounted on the support frame 14, in particular from below in the vertical direction of the vehicle, as indicated in FIG. 2 with a double arrow, such that the respective storage module 18 can be individually and thus time-efficiently and cost-effectively mounted on the support frame and dismounted from it and thus replaced.

Figure 4:
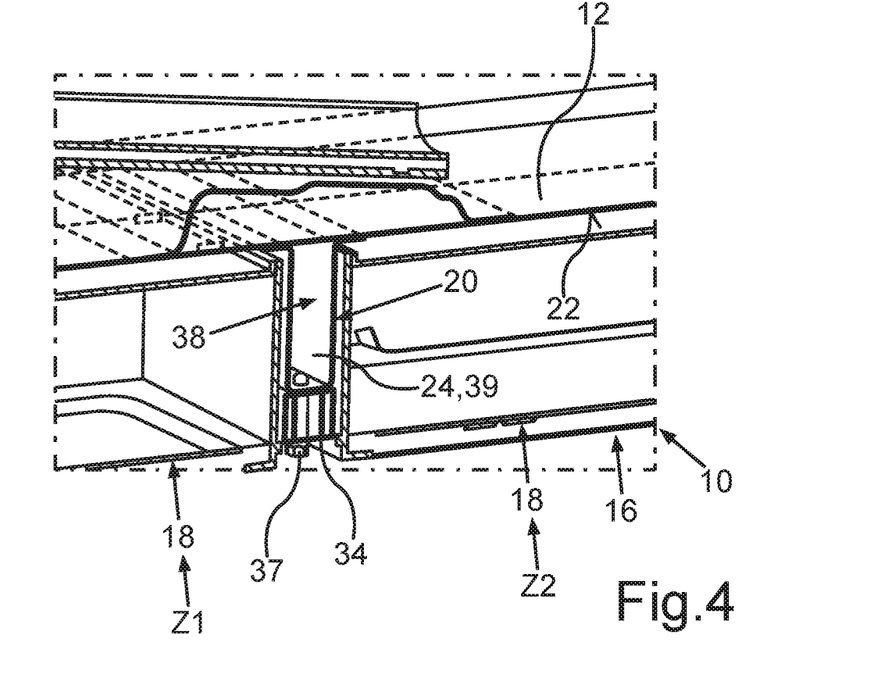
FIG. 4 in sections, is a schematic, cut and perspective view of the mounting arrangement.

It can be seen particularly well from FIG. 4 that, for example, the respective cross member element 34 also projects into the respective free space 20 provided between the respective rows Z1-Z5 arranged adjacent to each other in the longitudinal direction of the vehicle. In the completely manufactured state of the motor vehicle or the mounting arrangement 16, for example, the retaining element 24 has a first height running in the vertical direction of the vehicle, wherein the respective cross member element 34 of the support frame 14 has, for example, a second height running in the vertical direction of the vehicle. Here, it is preferably provided that the first height is twice as great as the second height, whereby a particularly advantageous absorption and guidance of accident-related loads or forces can be implemented in particular in the event of a side impact. However, the ratio of the heights can also be designed differently. Advantageously, it is provided here that the respective cross member element 34 of the support frame 14 is arranged directly below the respective body shell-side retaining element 24 in the vertical direction of the vehicle, wherein the retaining element 24 is fixed to the body and the cross member element 34 is fixed to the frame. This enables particularly advantageous load paths to be implemented, which are fixed to the body and fixed to the frame. In particular, the sum of the heights is substantially the complete height of the energy storage unit 10.

It can easily be seen from FIG. 4 that, when the support frame 14 is mounted on the vehicle, the respective cross member element 34 of the support frame 14 rests with its upper side flat against the base of the retaining element 24, which is U-shaped in cross-section here and is provided on the main floor 12.

It is particularly easy to see from an overview of FIGS. 3 and 4 that the respective retaining element 24 is a retaining bracket or a retaining support in the form of a cross member 39, which extends at least substantially in the transverse direction (y) of the vehicle. The vehicle transverse direction is illustrated in FIG. 3 by a double arrow 27, wherein a double arrow 29 illustrates the vehicle longitudinal direction (x). The respective retaining element 24 is provided on the underside of the flat main floor 12, which is preferably designed to be liquid-tight and faces the road, i.e., it protrudes downwards from it and is thus a component of the body shell. In the transverse direction of the vehicle, the main floor 12 is connected on both sides to respective side skirts 40 of the body, of which only one inner side is indicated schematically in FIG. 3, such that the energy storage unit 10, for example, in the mounting arrangement 16 is at least partially covered or covered by the sides skirts 40 outwards in the transverse direction of the vehicle. The respective retaining elements 24, designed as cross members 39, extend from one of the side skirts 40 continuously in the transverse direction of the vehicle to the respective other side skirt 40, such that a particularly high level of rigidity can be represented. It can be provided that the respective cross member 39 is attached at its end to the respective side skirt 40, i.e., is mounted in a suitable manner, or that a small distance remains between the end face of the respective cross member 39 and the inside of the side skirt 40. Furthermore, in order to implement a particularly high level of rigidity, it is provided that the support frame 14, in particular via the longitudinal member elements 26, is non-destructively detachably mounted on the side skirts 40. For this purpose, for example, the support frame 14 is non-destructively detachably screwed to the side skirts 40, in particular via the longitudinal member elements 26.

Due to the above-described design of the transverse load and connection structure formed by means of the cross members 39 (retaining elements 24), a load path running in the transverse direction of the vehicle can form via the respective side skirt 40 and the respective retaining element 24 or the cross member 39 up to the opposite side skirt 40, in particular in the event of a side impact, such that accident-related forces can be absorbed and guided via the retaining element 24/the cross member 39 and thus via the body. The transverse load paths which are fixed to the body run between the side skirts 40, since the cross members 39 extend into the space between the side skirts 40 and— viewed in the vertical direction of the vehicle (z)—are arranged at the same height. By means of the transverse load paths formed by the cross members 39 formed in a side crash, for example, excessive forces acting on the energy storage unit 10 can be avoided. A further load path can be formed via the respective cross member element 34 of the support frame 14, which also extends in the transverse direction of the vehicle. The first load path and the further load path form a transverse load path, one third of which is fixed to the frame and two thirds of which is fixed to the body, since the first height is twice as great as the second height, since the retaining element 24/the cross member 39 is a component of the body shell and since the respective cross member element 34 is a component of the support frame 14. At least via the longitudinal member element 28 of the support frame 14, a load path, also referred to as a longitudinal load path, can also be formed running in the longitudinal direction of the vehicle, such that, for example, accident-related forces running in the longitudinal direction of the vehicle can also be advantageously absorbed and guided.

It can be seen particularly clearly from FIG. 4 that the support frame 14 or the energy storage unit 10 of the mounting arrangement 16 is non-destructively detachably mounted on the body at least by the support frame 14 being screwed to the respective retaining element 24, in particular via the cross member elements 34. A mounting screw 37 can be seen in FIG. 4, by means of which the support frame 14 is screwed to the retaining element 24 via the cross member element 34 which can be seen in FIG. 4. On the retaining element 24, corresponding threaded holes are provided for this purpose, into which a mounting screw 37 can be screwed in each case. Here, the threaded holes can be formed directly in the retaining element 24. Alternatively, the retaining element 24 can be provided with a through hole for the passage of the mounting screw 37 and the threaded hole can be provided on a screw-on piece arranged on the inside of the retaining element 24.

As can be further seen from FIG. 4, the retaining element 24 is placed on the underside 22 of the main floor 12 from below in the vertical direction of the vehicle. The retaining element 24 is a profile part which has an open hollow cross-section 38. The open hollow cross-section is closed by the main floor 12 and is thus supplemented to form a closed hollow cross-section. The retaining element 24 has a U-shaped cross-section, wherein mounting flanges for connection to the main floor 12 protrude laterally from the two sides of the U at the edge.

The cross member element 34 is in turn designed as a hollow profile and has several chambers that are completely closed in the peripheral direction. A further advantage of the previously described height ratios between the cross member element 34 and the retaining element 24 is that the mounting screw 37 for screwing the support frame 14 to the retaining element 24 can be kept particularly short. In this way, tolerances can be kept low and the support frame 14 can easily be screwed to the body. The retaining elements 24 and thus the respective transverse load paths, which can be formed via the retaining elements 24 and are fixed to the body, under the main floor 12 can be positioned independently of the respective seat cross members, which are located on the opposite side of the main floor 12 facing the passenger compartment or are attached there and serve to connect the vehicle seats, such that an advantageous absorption and guidance of forces can be implemented.

It is to be highlighted that it is also advantageous that, due to the design of the energy storage unit 10 according to the invention, in particular the support frame 14 and the design of the connecting structures on the body side, the transverse load paths on the main floor 12 and on the support frame 14 do not have to be sealed from one another in the interface region, because the sealing to the passenger compartment occurs by means of the main floor 12 itself, such that the cross members 39 or the retaining elements 24 are arranged in the wet region. The storage modules 18 are also designed to be liquid-tight, such that moisture in the connecting region between the support frame and retaining element is not harmful.

Figure 5:
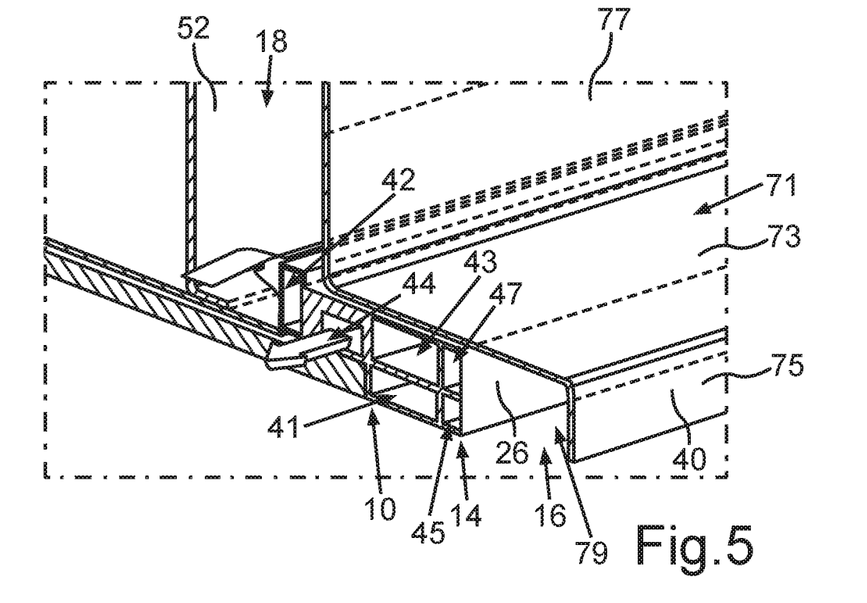
FIG. 5 in sections, is a schematic, cut and perspective front view of the mounting arrangement.

FIG. 5 shows a particularly advantageous coolant flow of the energy storage unit 10. Since, for example, the respective longitudinal member element 26 is non-destructively detachably screwed to the respective side skirt 40, the respective longitudinal member element 26 is used or referred to as a screw-on strip, for example. The screw-on strip has several chambers 41, 42, 43, 44, 45 and 47 running in the longitudinal extension of the longitudinal member elements 26, of which at least the chambers 42 and 44 are completely closed in the peripheral direction. These two chambers 42, 44 of the longitudinal member element 26 can be flowed through by a coolant which is designed in particular as a cooling liquid or cooling water. In the exemplary embodiment illustrated in FIG. 5, for example, the chamber 42 is referred to as the forward flow channel, via which or by means of which the coolant is guided to the respective storage module 18. The coolant can then flow through the respective storage module 18. Subsequently, the respective storage module 18 can occur as a result of a heat transfer from the respective storage module 18 to the coolant, whereby the coolant is heated and the respective storage module 18 is cooled. The chamber 44 is used as a return flow channel to discharge the heated coolant from the respective storage module 18 after cooling the respective storage module 18. In this way, the aforementioned coolant duct is integrated into the respective longitudinal member element 26. An introduction of coolant, for example, into the chamber 42 and an outlet of coolant, for example, from the chamber 44, occur, for example, via respective integrated nozzles, wherein a sealing takes place via one or more flat seals. The nozzles are integrated in the cooling floor or in the support frame 14, for example.

In FIG. 5, a perspective depiction of a part of the side skirt 40 can be seen. The side skirt 40 can basically be designed in one piece, for example as an extruded profile, or else—as in the exemplary embodiment according to FIG. 5—in shell construction. FIG. 5 shows the inner shell 71 of the side skirt 40, which has a multiple angled course. Here, the inner shell 71 has a horizontally running first wall section 73, to which a second wall section 75 projecting vertically downwards connects, which serves as a mounting flange for an outer shell of the side skirt 40, for example. A third wall section 77 which projects vertically upwards connects to the first wall section 73 on the inside. It can also be seen that the longitudinal member element 26 is in overlap position with the inner shell 71 of the side skirt 40 and abuts against it from below. There is still a free space 79 between the longitudinal member element 26 and the second wall section 75 of the side skirt 40, which on the one hand enables the compensation of positional tolerance when attaching the support frame 14 to the body shell, and on the other hand ensures that, in the event of a side impact, the side skirt 40 can only deform to a certain extent, namely around exactly this free space 79, before it comes into contact with the longitudinal member element 26.

Figure 6:
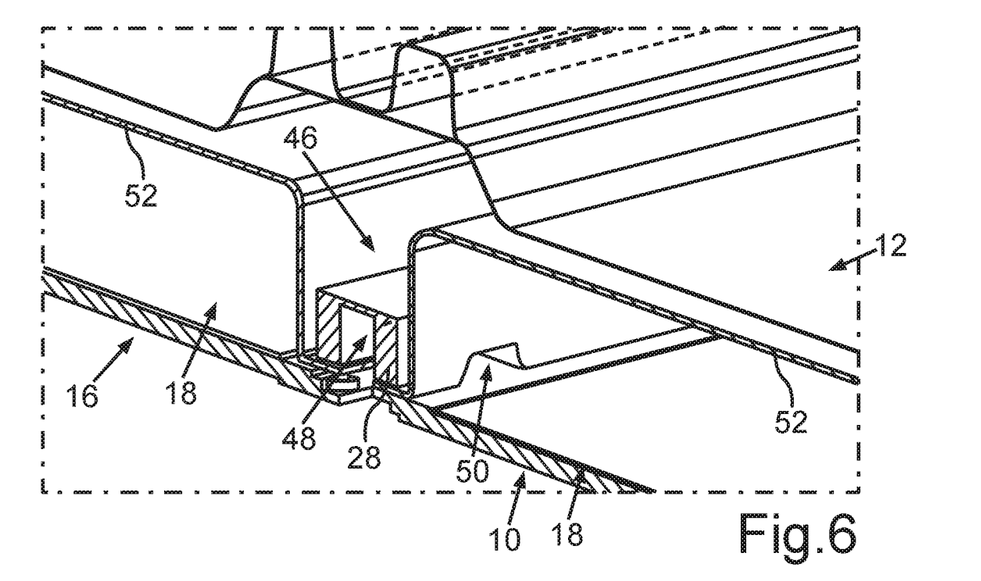
FIG. 6 in sections, is a further schematic, cut and perspective front view of the mounting arrangement.

It can be seen particularly clearly from FIG. 6 that the longitudinal member element 28 projects into a free space 46, which is provided in the transverse direction of the vehicle between the adjacently arranged columns S1 and S2. In this way, a particularly advantageous longitudinal load path can be formed. In addition, the longitudinal member element 28 has, at least in a longitudinal region or over its entire extension, a peripherally open or closed hollow cross-section 48. The hollow cross-section 48 provides space for at least one conductor rail or several conductor rails. In other words, at least one or more conductor rails can be arranged in the hollow cross-section 48 and thus in the longitudinal member element 28, wherein, for example, the storage modules 18 can be electrically connected to one another and/or electrically connected to at least one further component such as, for example, power electronics of the electrical machine via the respective conductor rail. In this way, a particularly advantageously protected conductor rail system can be integrated into the longitudinal load path, which, for example, is located at least substantially in the centre of the motor vehicle with respect to the transverse direction of the vehicle. A sealing of the hollow cross-section 48, in particular in the vehicle vertical direction downwards, can be implemented, for example, by means of at least one cover not shown in the Figures, which is arranged, for example in the vehicle vertical direction from bottom to top, on the longitudinal support element 28 and is connected thereto. In particular, the cover is non-destructively detachably connected to the longitudinal member element 28, in particular screwed to the longitudinal member element 28. Furthermore, FIG. 6 shows a tight passage 50 via which, for example, the respective storage module 18 can be or is electrically connected to the current rail accommodated in the hollow cross-section 48.

Figure 7:
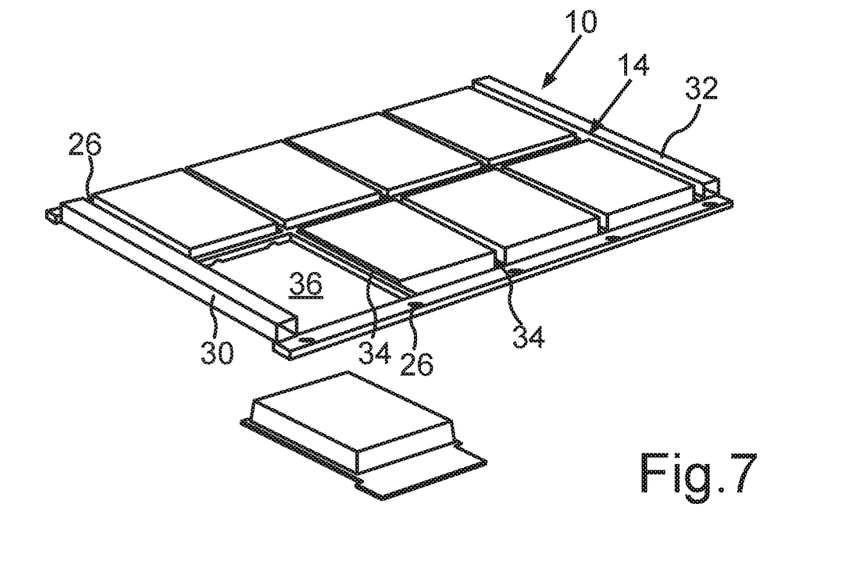
FIG. 7 is a further schematic exploded view of the energy storage unit.

As can be seen particularly well from FIG. 7, the respective storage module 18 can be replaced individually on the support frame 14, while the respective other storage modules 18 remain held on the support frame 14 and, in particular, while the support frame 14 remains mounted or is mounted on the body. The storage modules 18 are designed as intrinsically sealed units, i.e., protected against the ingress of moisture, which can be inserted from bottom to top in the vertical direction of the vehicle (z-direction) to the support frame 14 and inserted into the respective corresponding receiving openings 36. In this way, it is possible, for example, to dismount the respective storage module 18 from the support frame 14 individually and thus independently from the respective other storage modules 18 and to remove it downwards in the vehicle vertical direction while the support frame remains mounted on the body shell. This storage module 18 can then be replaced by another new storage module, which is moved upwards in the vertical direction of the vehicle from the bottom to the top to the support frame 14 and inserted into the then free receiving opening 36. In this way, the respective storage module 18 can be individually assembled and thus exchanged.

Figure 8:
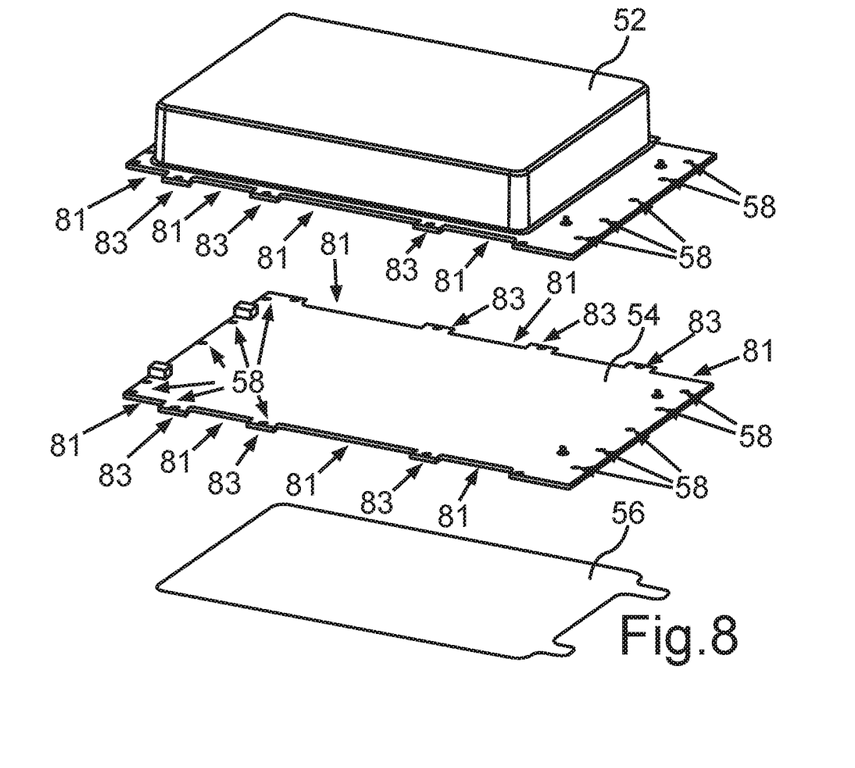
FIG. 8 is a schematic exploded view of one of the storage modules.

FIG. 8 shows one of the storage modules 18 in a schematic exploded view. The respective storage module 18 is designed as an intrinsically sealed module and has, for example, a hood- or trough-shaped base body 52, which is manufactured, for example, in a die-casting process. In addition, base plates 54 and 56 are provided, of which the base plate 54 serves as a cover for the liquid-tight sealing of the base body 52. The base plate 56 can, for example, serve as impact protection for particles, in particular stones or the like, thrown against the storage modules from the road surface. In this way, particularly advantageous overall EMC protection can be implemented. It can also be seen that both the base plate 54 and the base body 52 are provided at their edges, in the region of which they are screwed to the support frame 14 or the respective longitudinal member elements 34, with recesses 81 arranged at a distance from each other, whereby between each two adjacent recesses 81, a quasi-free-standing mounting flange 83 or mounting lug is formed, on which a common fixing point 58 of the base plate 54 and the base body 52 on the support frame 14 is located. The recesses 81 of the base plate 54 and the base body 52 and the respective mounting flanges 83 on these components thus overlap each other when the storage modules 18 are in their mounted state.

Figure 9:
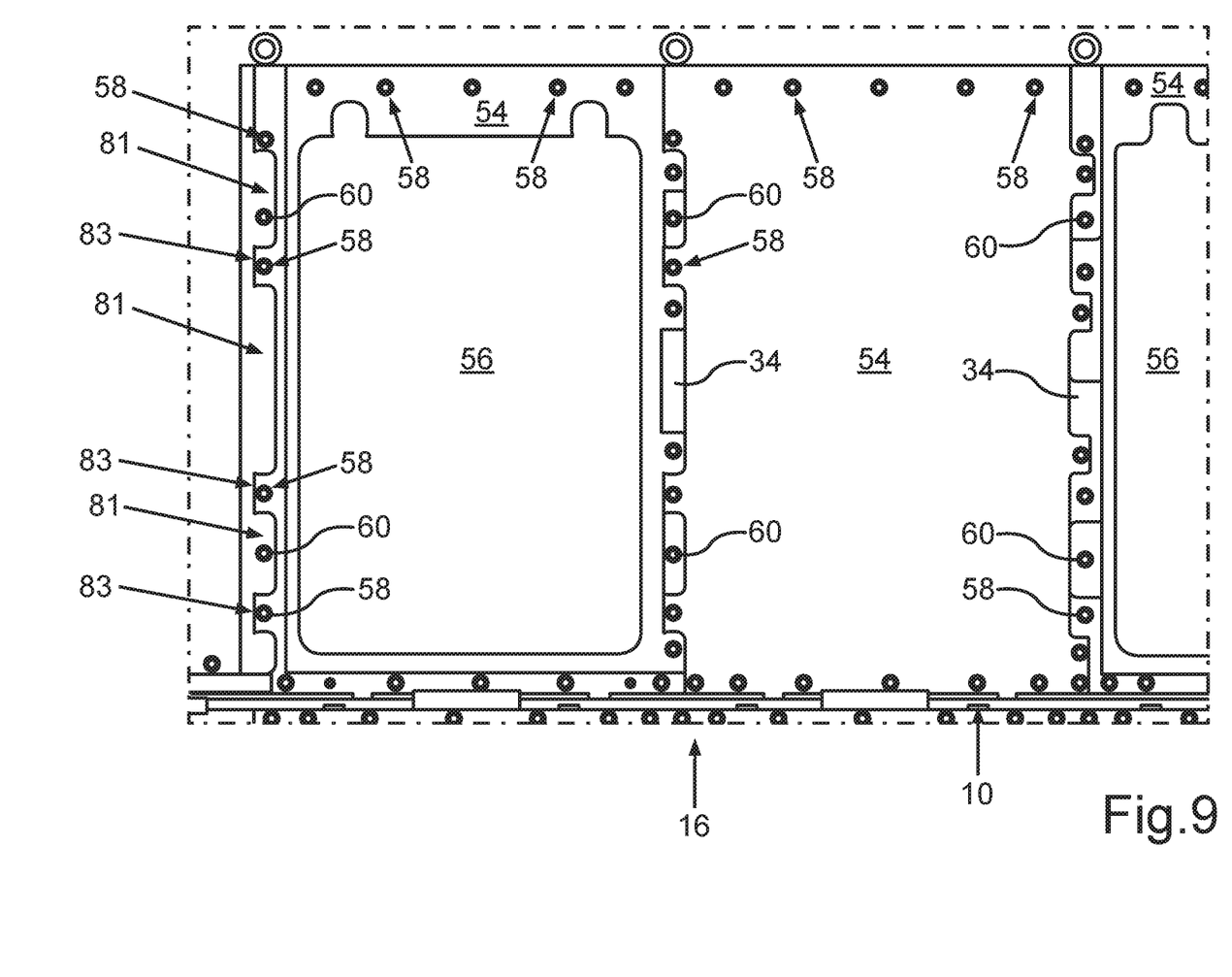
FIG. 9 in sections, is a schematic bottom view of the mounting arrangement.

Finally, FIG. 9 shows the mounting arrangement 16 in a schematic bottom view. Here, the fixing points 58 can be seen particularly clearly in FIG. 9, where the respective storage module 18 is non-destructively detachably screwed to the support frame 14. Furthermore, FIG. 9 shows fixing points 60, where the support frame 14 is screwed to the body or the body shell. Due to the recesses 81 in the base plates 54 and the base bodies 52, the mounting flanges 83 of adjacent storage modules 18 can be arranged in the respective recess 81 in the respective other storage module, such that the base plates 54 of the storage modules can be arranged with only a small space between them, in particular for tolerance reasons. There is no overlap between the base plates 54 in the vertical direction of the vehicle (z-direction), such that the overall result is a flat floor surface on the energy storage unit 10. The mounting flanges 83 and also all other edge regions of the storage modules 18, which overlap with the support frame 14, are in contact in the assembled state either directly with the support frame 14 or its cross-member elements 30, 32, 34 or longitudinal member elements 26, or else there is still a suitable separating layer or a separating element or similar between them. It is important that the possibility of inserting the storage modules 18 into the respective receiving opening 36 be limited by the mounting flanges 83 and the other edge regions of the storage modules being in contact with the support frame 14. A complete insertion is therefore not possible.

Furthermore, it can be seen from FIG. 9 that the fixing points 60 provided in the region of the cross member elements 34 for connecting the support frame 14 to the body shell, in particular to the cross members 39 on the underside of the main floor 12, are also located in, or at the height of, the recesses 81. These are therefore freely accessible from below when the storage modules 18 are already mounted on the support frame 14, which also applies to all other fixing points 58 and 60 at other points on the support frame 14 or the storage modules 18. Advantageously, this results in the possibility of a complete pre-assembly of the energy storage unit 10, before it is then moved as an assembly unit to the main floor 12 and screwed to it from below. This is particularly advantageous for the manufacture of the vehicle from an assembly point of view, despite the very high weight of the energy storage unit 10, which can easily be several hundred kilograms, but which is still easily manageable in a production line. If, however, a storage module 18 on a completed vehicle needs to be replaced for repair or maintenance reasons, the workshop technician does not have to remove the entire energy storage unit 10 from the vehicle. This can remain mounted on the vehicle, while the technician only separates the respective storage module 18 from the support frame 14 by loosening the fixing points 58 and separating the storage module 18 from the support frame 14 by a relative movement in the z-direction, thereby pulling it out of the receiving opening 36. The installation is carried out in reverse order.

It should be noted that the assembly direction for attaching the energy storage unit 10 to the vehicle and that for attaching the storage modules 18 to the support frame 14 is identical and takes place from bottom to top in the vehicle vertical direction (z-direction).

Overall, it can be seen from the Figures that the design of the energy storage unit 10 allows a particularly high degree of rigidity of the energy storage unit 10 and of the vehicle as a whole to be implemented. In particular, accident-related force impacts running in the transverse direction of the vehicle, such as those resulting from a lateral pole impact or a side impact, can be redirected such that particularly advantageous accident performance can be represented. At the same time, the weight of the energy storage unit 10 can be kept particularly low, since the storage modules 18 are used as intrinsically sealed individual modules. In addition, a particularly high level of safety can be implemented, in particular against thermal propagation, such that, for example, if a thermal event occurs in one of the storage modules 18, it is possible to prevent this thermal event from spreading to other storage modules 18 at least for a long period of time. In addition, the energy storage unit 10 can be used to implement a fast, cost-effective service and storage concept.

The invention claimed is:

1. An energy storage unit for a motor vehicle, comprising:
a support frame which is non-destructively detachably mountable on a body of the motor vehicle; and
a plurality of storage modules which are mountable on the support frame for storing electrical energy;
wherein when the storage modules are mounted on the support frame a free space is provided between at least two adjacently arranged storage modules, wherein into the free space, in a state of the support frame mounted on the body, a retaining element, provided on a side of a floor of the body pointing downwards in a vehicle vertical direction, projects, and wherein the support frame is mountable on the retaining element;
wherein the storage modules are configured as intrinsically sealed units which are arrangeable on the support frame from bottom to top in the vehicle vertical direction;
wherein the support frame has a grid structure comprised of longitudinal member elements and cross member elements that define respective receiving openings for each of the storage modules, wherein each of the respective receiving openings is configured as a through opening;
wherein the storage modules, in a state of the energy storage unit mounted on the motor vehicle, are inserted into the respective receiving opening from below and project beyond an upper side of the support frame facing the floor.

2. The energy storage unit according to claim 1, wherein the storage modules are non-destructively detachably mounted on the support frame in a state of being mounted on the support frame.

3. The energy storage unit according to claim 1, wherein each of the storage modules is independently mountable and dismountable on the support frame.

4. The energy storage unit according to claim 3, wherein, when the support frame is mounted on the motor vehicle, one of the storage modules is replaceable by detaching the one of the storage modules from the support frame and removing the one of the storage modules downward in the vehicle vertical direction from the support frame.

5. A mounting arrangement, comprising:
an energy storage unit; and
a body of a motor vehicle;
wherein the energy storage unit has a support frame non-destructively detachably mounted on the body and a plurality of storage modules mounted on the support frame for storing electrical energy;
wherein a free space is provided between at least two adjacently arranged storage modules, wherein into the free space a retaining element, provided on a side of a floor of the body pointing downwards in a vehicle vertical direction, projects, and wherein the support frame is mounted on the retaining element;

wherein the storage modules are configured as intrinsically sealed units which are arranged on the support frame from bottom to top in the vehicle vertical direction;

wherein the support frame has a grid structure comprised of longitudinal member elements and cross member elements that define respective receiving openings for each of the storage modules, wherein each of the respective receiving openings is configured as a through opening;

wherein the storage modules are inserted into the respective receiving opening from below and project beyond an upper side of the support frame facing the floor.

6. A motor vehicle, comprising:

a body having a load-bearing support structure; and an energy storage unit connected to the load-bearing support structure on an underside of the body, wherein the energy storage unit comprises a support frame having a plurality of storage modules for storing electrical energy which is non-destructively detachably mounted on the body, wherein the energy storage unit is arranged substantially underneath a floor extending between side skirts of a passenger compartment of the motor vehicle;

wherein the support frame is mounted on a retaining element which is attached to the floor on an underside of the floor that faces a roadway;

wherein the retaining element projects into a free space provided between at least two adjacently arranged storage modules;

wherein the storage modules are arranged on the support frame from bottom to top in a vehicle vertical direction;

wherein the support frame has a grid structure comprised of longitudinal member elements and cross member elements that define respective receiving openings for each of the storage modules, wherein each of the respective receiving openings is configured as a through opening;

wherein the storage modules are inserted into the respective receiving opening from below and project beyond an upper side of the support frame facing the floor;

wherein the storage modules are non-destructively detachably mounted on the support frame;

wherein the storage modules are mountable on the support frame when the support frame is mounted on the body due to accessibility of a respective mounting point of a respective storage module on the support frame.

7. The motor vehicle according to claim 6, wherein the retaining element is formed by a cross element running in the vehicle vertical direction.

8. The motor vehicle according to claim 7, wherein respective side skirts connect to the floor on sides of the floor in a transverse direction of the motor vehicle and wherein the cross element extends from one of the respective side skirts continuously in the transverse direction of the motor vehicle to the other of the respective side skirts.

9. The motor vehicle according to claim 8, wherein the support frame is non-destructively detachably mounted on at least one of the side skirts.

\* \* \* \* \*